United States Patent [19]

Kogure

[11] Patent Number: 5,223,065
[45] Date of Patent: Jun. 29, 1993

[54] PNEUMATIC TIRE

[75] Inventor: Tomohiko Kogure, Ashigara, Japan

[73] Assignee: The Yokohama Rubber Co., Ltd., Tokyo, Japan

[21] Appl. No.: 742,472

[22] Filed: Aug. 2, 1991

Related U.S. Application Data

[63] Continuation of Ser. No. 609,137, Nov. 6, 1990, abandoned, which is a continuation of Ser. No. 301,083, Jan. 25, 1989, abandoned.

[30] Foreign Application Priority Data

Jan. 26, 1988 [JP] Japan .................................. 63-13537

[51] Int. Cl.$^5$ ..................... B29D 30/00; B60C 11/03
[52] U.S. Cl. ..................... 156/110.1; 152/209 R; 264/219; 425/46
[58] Field of Search .......... 152/209 R, 209 D, 209 A, 152/209 B; 156/110.1; 425/28.1, 46; 264/219, 220, 501, 502; 29/416; 409/902

[56] References Cited

U.S. PATENT DOCUMENTS

| | | | |
|---|---|---|---|
| 2,006,197 | 6/1935 | Ewart et al. | 152/209 R |
| 3,989,780 | 11/1976 | Vorih | 264/40.1 |
| 4,327,792 | 5/1982 | Landers | 152/209 R |
| 4,411,175 | 10/1983 | Takahashi et al. | 29/416 |
| 4,503,898 | 3/1985 | Hitzky | 152/209 R |
| 4,553,918 | 11/1985 | Yoda et al. | 425/46 |
| 4,691,431 | 9/1987 | Hayata | 264/220 |

OTHER PUBLICATIONS

W. J. Vorih, "Designing Quiet Tread Spacings for Tires," presented at the 99th Rubber Division Meeting, American Chemical Society, Spring 1971.

Primary Examiner—Geoffrey L. Knable
Attorney, Agent, or Firm—Nikaido, Marmelstein, Murray & Oram

[57] ABSTRACT

A pneumatic tire having a tread pattern formed on the surface of the tire by using at least two types of main pattern elements having a length in the circumferential direction of the tire equal to at least 1.0% of that of the outer periphery of the tire and a subpattern element having a length in the circumferential direction of the tire of at least 0.5 mm and equal to 0.6% or less of that of the outer periphery of the tire, combining one of the main pattern elements with the subpattern element to prepare a plurality of types of combination pattern elements different from each other in the length of the circumferential direction of the tire and the pattern, and periodically disposing these pattern elements along the circumferential direction of the tire.

3 Claims, 5 Drawing Sheets

PNEUMATIC TIRE

This application is a continuation of application Ser. No. 609,137 filed Nov. 6, 1990, which in turn is a continuation of application Ser. No. 301,083, filed Jan. 25, 1989, both now abandoned.

BACKGROUND OF THE INVENTION

A tread pattern formed on the tread surface of a tire known to the art generally comprises, as shown in FIG. 3, a design composed of main grooves 1, subgrooves 2, blocks 4 each having a thin kerf 3, etc. This tread pattern generally comprises a combination of pattern elements P each being a minimum unit wherein the same design repeatedly appears along the circumferential direction of the tire.

The pattern element has a plurality of types different from each other in the length in the circumferential direction of the tire. It is possible to reduce noises generated from the tire through provision of a proper combination of a plurality of types of pattern elements having different lengths over the entire portion in the circumferential direction of the tire. For example, increasing the ratio ($\alpha$) of the length of the longest pattern element to that of the shortest pattern element among a plurality of types of pattern elements as large as possible based on the frequency modulation theory is said to be effective in preventing the frequency of noises generated from the tire from concentrating on a particular one.

However, when the difference in the length between pattern elements in the circumferential direction of the tire becomes large due to an increase in the ratio $\alpha$, the difference in the rigidity between the pattern elements is increased, which causes the element portions having smaller rigidity to be abraded at a higher rate than the rate of abrasion of the element portions having larger rigidity, i.e., brings about abnormal abrasion. Therefore, when the ratio $\alpha$ is increased, it is a common practice to reduce the difference in the length between adjacent pattern elements having different length through an increase in the number of types of pattern elements, thus reducing the difference in the rigidity. For example, in general, when the ratio $\alpha$ is around 1.3, the use of three types of pattern elements is sufficient for preventing the abnormal abrasion, while when the ratio $\alpha$ is increased to around 1.5 for the purpose of further reducing the noises generated from the tire, the occurrence of the abnormal abrasion cannot be prevented unless the number of types of the pattern elements is increased to about 5.

The length of the pattern element of the conventional tire is about 1% at the smallest relative to the length of the outer periphery of the tire. No tire comprising a combination of pattern elements having a length smaller than that of the above-described pattern element is known.

This is because a decrease in the length of the pattern element brings about a lowering in the rigidity of the pattern element which unfavorably results in the occurrence of abnormal abrasion and a lowering in the driving stability. Since the number of the pattern elements per peripheral length of the tire is about 80 at the largest although it depends upon the types of the tire, the average length of the pattern elements in the circumferential direction corresponds to about 1.25% of the length of the outer periphery of the tire. Therefore, under these conditions, even when the ratio ($\alpha$) is increased, the maximum ratio of the ratio ($\alpha$) is 1.5, because of the length of the shortest pattern element is about 1.0% relative to the outer periphery of the tire.

Further, an increase in the number of types of the pattern element makes the mold of the tire more complicated. This increases the cost for producing the mold, so that the production cost of the tire is increased.

SUMMARY OF THE INVENTION

An object of the present invention is to provide a pneumatic tire having a tread pattern not only capable of effectively reducing the noise of the tire but also free from abnormal abrasion.

Another object of the present invention is to provide a pneumatic tire which can reduce the noise of the tire without an increase in the cost of the mold used for molding the tire.

BRIEF DESCRIPTION OF THE DRAWINGS

FIGS. 5(a) and 5(b) are each a diagram showing the order of disposition of the pattern elements in a tread pattern.

DETAILED DESCRIPTION OF THE PREFERRED EMBODIMENT

The above-described objects can be attained by a pneumatic tire having a tread pattern comprising a plurality of types of pattern elements different from each other in the length of the circumferential direction of the tire and periodically disposed along the circumferential direction of the tire, wherein said pattern element comprises at least two types of main pattern elements having a length in the circumferential direction of the tire equal to at least 1.0% of the length of the outer periphery of the tire (hereinafter referred to as "main elements $P_M$") and a subpattern element adapted for adjusting the length of said main element through a combination thereof with one of said main elements $P_M$ (hereinafter referred to as "subelements $P_S$") and said subelement $P_S$ comprises at least one type of element having a length in the circumferential direction of the tire of at least 0.5 mm and equal to 0.6% or less of the length of the outer periphery of the tire.

The term "pattern element" used in the present invention is intended to mean a minimum unit constituting a tread pattern, i.e., a repeating unit wherein the same design repeatedly appears along the circumferential direction of the tire.

The pattern element comprises at least two types of main elements $P_M$ each having a great length in the circumferential direction of the tire and at least one kind of subelement $P_S$ having a remarkably little length in the circumferential direction of the tire. Subelement $P_S$ is not used by itself but always used in combination with main element $P_M$ for adjusting the length of main element $P_M$.

Figure 1:
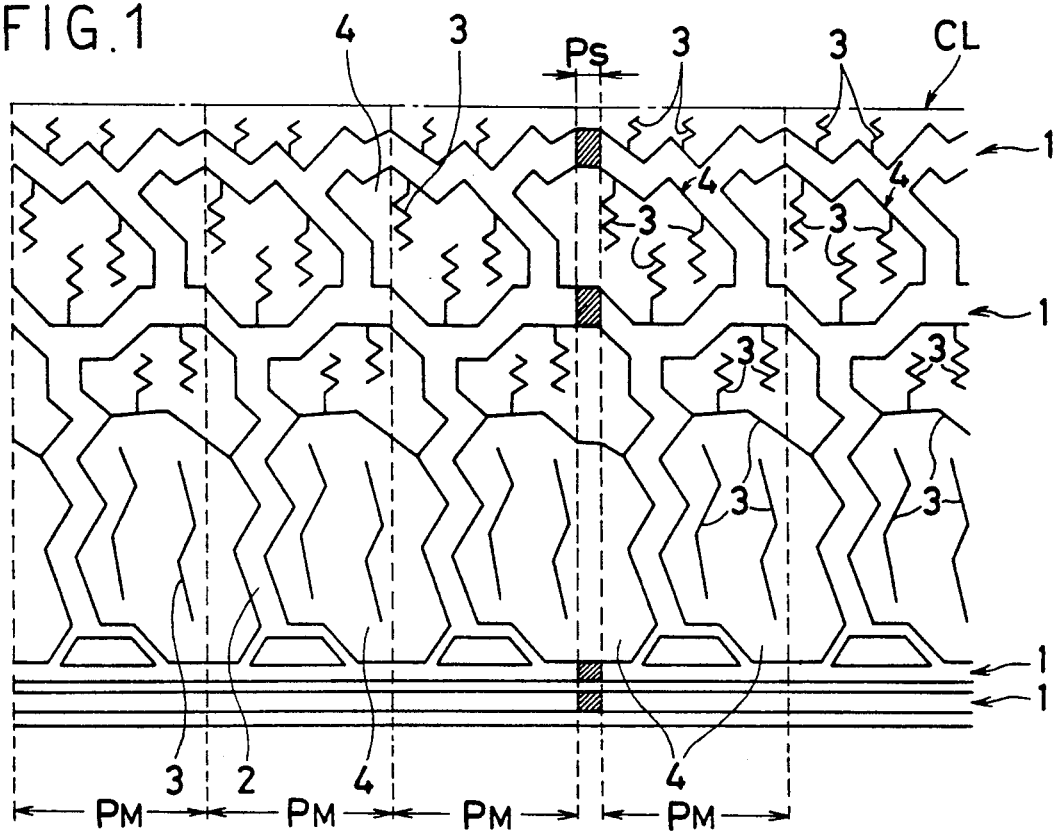
FIGS. 1 and 2 are each a plan view of one side portion from a tread width center line CL on a tread pattern of a pneumatic tire of the present invention.
Figure 2:
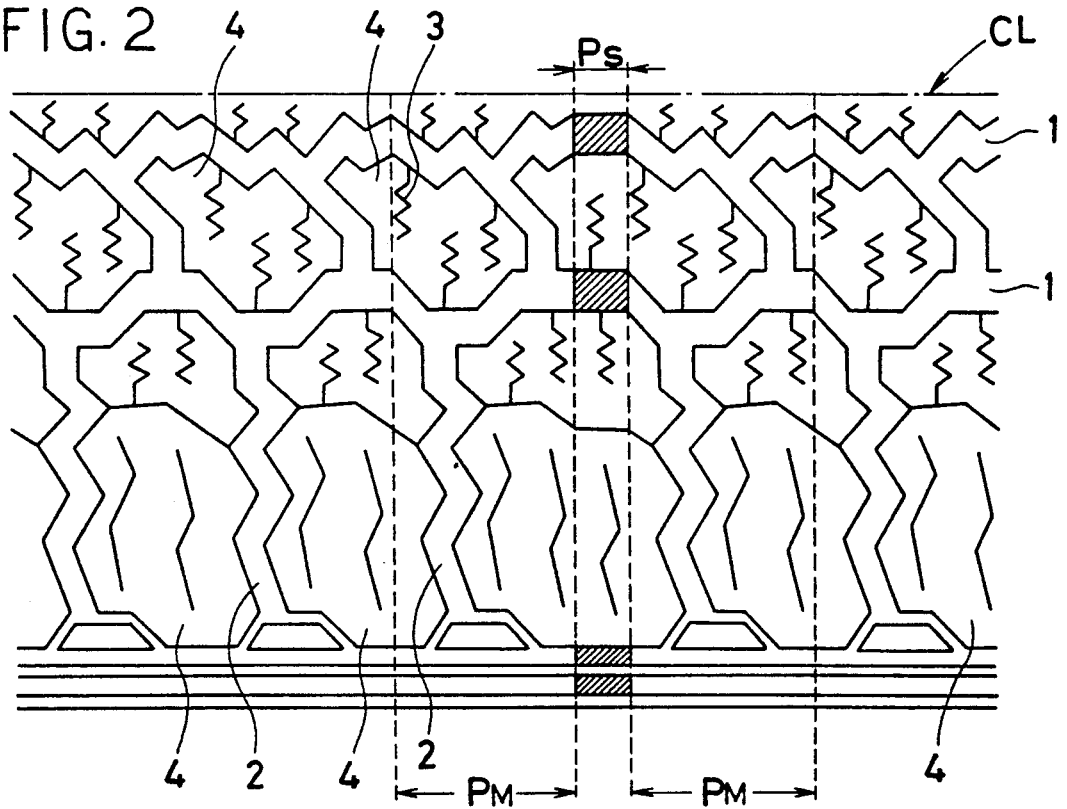
Figure 3:
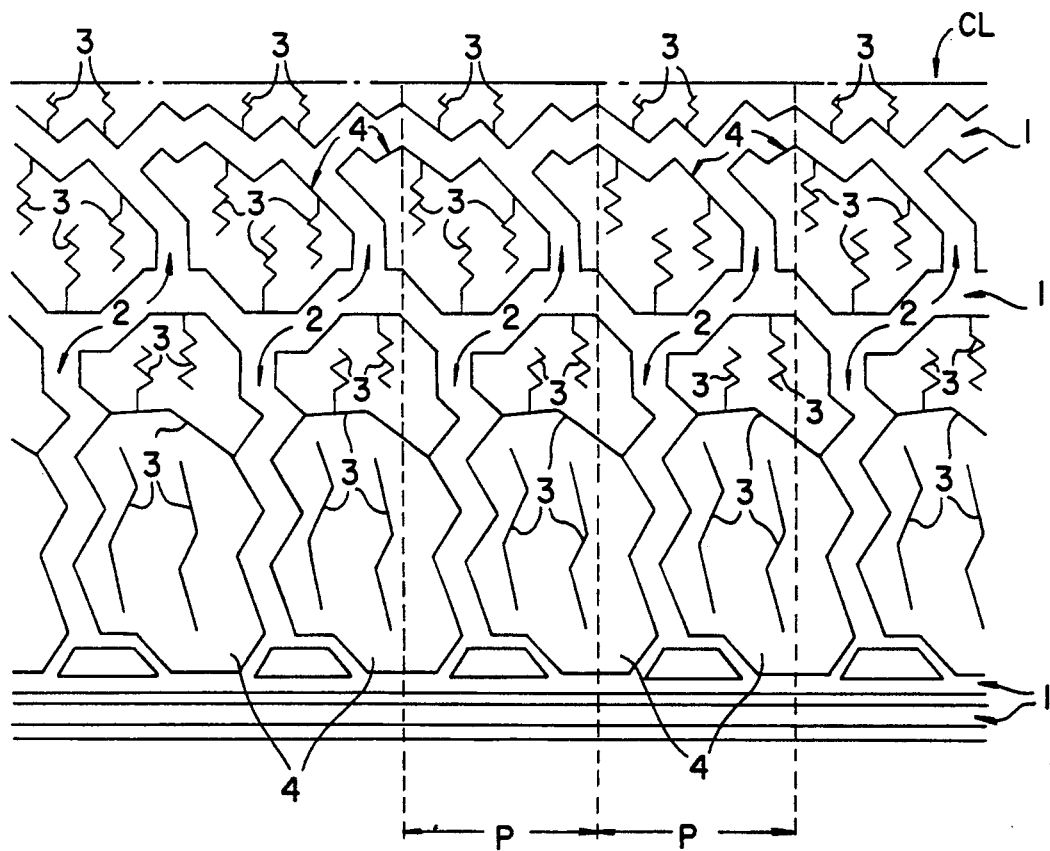
FIG. 3 is a plan view of one side portion from a tread width center line CL on a tread pattern of a conventional tire.

As with the pattern element shown in FIG. 3, the pattern element shown in FIG. 1 comprises main grooves 1, subgrooves 2, blocks 4 each having a thin sipe 3, etc. However, in the pattern element shown in FIG. 1, not only main elements $P_M$ but also subelement $P_S$ having a little length in the circumferential direction of the tire are disposed. The tread pattern shown in FIG. 2 has subelement $P_S$ having a design such that not only the length in the circumferential direction of the tire is slightly greater than that of subelement $P_S$ shown in FIG. 1 but also a thin sipe 3 is additionally provided.

In the present invention, it is necessary that the length of the main elements $P_M$ in the circumferential direction of the tire be at least 1.0%, preferably at least 1.1% of that of the outer periphery of the tire. When the length of the main elements $P_M$ in the circumferential direction of the tire is smaller than 1.0% of that of the outer periphery of the tire, the rigidity of the main elements $P_M$ is lowered, which brings about a lowering in the performance of the tire. On the other hand, when the length of the main elements $P_M$ in the circumferential direction of the tire is too great, the rigidity is excessively increased or the effect of decreasing the noise is lowered although this tendency varies according to the types of the tire. Therefore, it is preferred that the length of the main elements $P_M$ in the circumferential direction of the tire be 2.4% or less of that of the outer periphery of the tire.

In the present invention, it is preferred that subelement $P_S$ has a simple design structure comprising only a straight main groove in the circumferential direction of the tire. Even when the subelement $P_S$ is used in combination with other element, it is preferred to provide only a straight thin sipe at the block portion. That is, as shown in FIG. 1, the subelement $P_S$ has a simple design structure comprising a main groove connected to a main groove 1 of the main element $P_M$.

Subelement $P_S$ serves to adjust the length of the main element $P_M$ when used in combination with the main element $P_M$ and constitutes an apparently different pattern element. That is, the preparation of a "combination pattern element $P_C$" enables an apparent increase in the number of types of main element $P_M$.

It is necessary that the length of the subelement $P_S$ in the circumferential direction of the tire be 0.6% or less of that of the outer periphery of the tire. When the length of the subelement $P_S$ exceeds 0.6% of that of the outer periphery of the tire, the combination of the subelement $P_S$ with the main element brings about a large difference in the length between the element $P_C$ formed by the combination and the main element $P_M$. Since this brings about an increase in the rigidity between these pattern elements, there occurs abnormal abrasion. On the other hand, when the length of the subelement $P_S$ is smaller than 0.5 mm, no sufficient frequency modulation effect of the combination pattern element $P_C$ combined with the main element $P_M$ can be exerted, which renders the effect of reducing the noise unsatisfactory. The length of the subelement $P_S$ is preferably 1 to 4 mm.

In the above-described main element $P_M$ and subelement $P_S$, the number of types of main element $P_M$ is preferably 2 to 5 which are different from each other in the length of the circumferential direction of the tire, while the number of types of subelement $P_S$ is preferably 1 to 3 which are different from each other in the length of the circumference direction of the tire. When the number of types of main element $P_M$ which has a complicated design is too large, the manufacturing cost of a mold used for production of the tire is increased, which in turn brings about an increase in the cost of the tire itself.

Figure 4A:
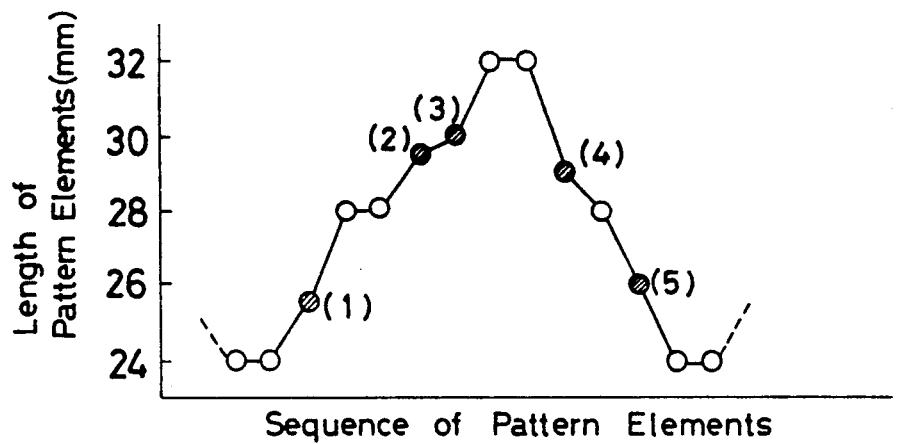
FIGS. 4(a), 4(b), and 4(c) are each a graph prepared by plotting the sequence of the pattern elements disposed along the circumferential direction of the tire against the length of the pattern elements and successively connecting the plots with a line.
Figure 4B:
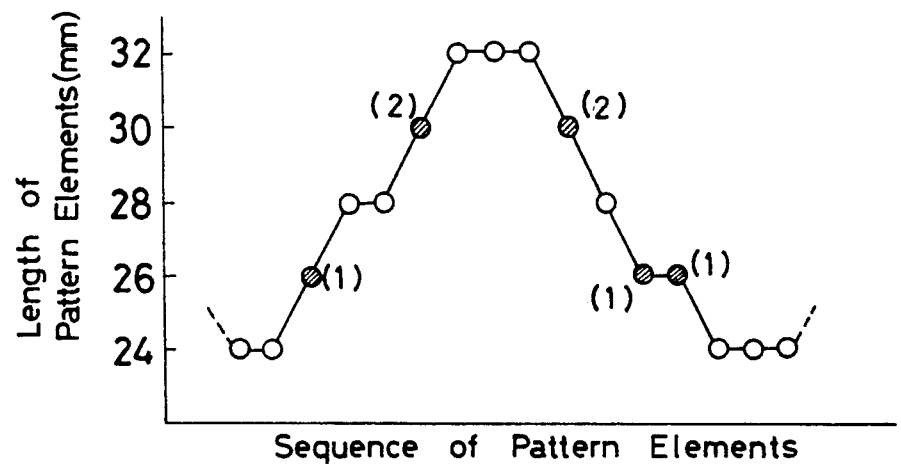
Figure 4C:
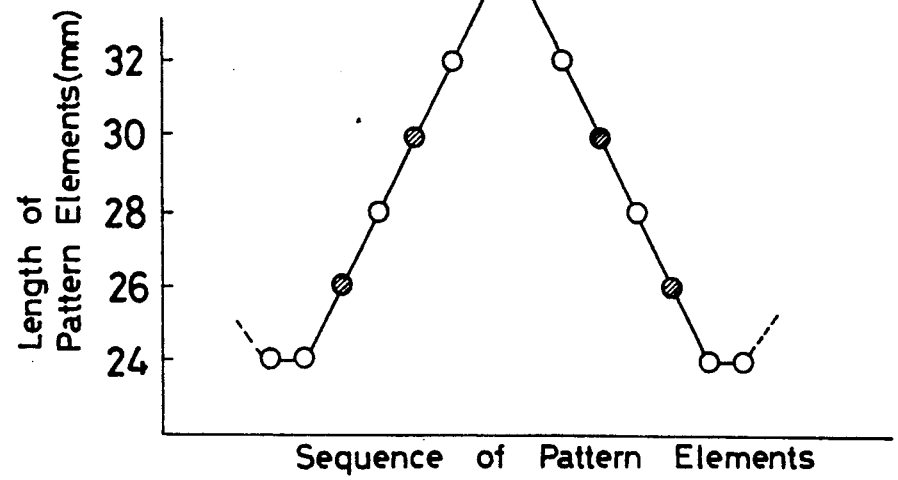

FIGS. 4(a), 4(b), and 4(c) are each a graph prepared by plotting the sequence of the pattern elements disposed along the circumferential direction of the tire against the length of the pattern elements and successively connecting the plots with a line. In the drawing, an open circle represents the length of the main element $P_M$ while a hatched circle that of the combination pattern element $P_C$.

In FIG. 4(a), three types of main elements $P_M$ respectively having lengths of 24.0 mm, 28.0 mm, and 32.0 mm and three types of subelement $P_S$ respectively having lengths of 1.0 mm, 1.5 mm, and 2.0 mm are used to prepare five types of combination pattern element $P_C$, i.e., combination pattern element $P_C(1)$, (2), (3), (4), and (5). These elements are ones prepared by combining the following main elements $P_M$ and subelements $P_S$.

$$(1) = P_M(24.0) + P_S(1.5 \text{ mm})$$

$$(2) = P_M(28.0) + P_S(1.5 \text{ mm})$$

$$(3) = P_M(28.0) + P_S(2.0 \text{ mm})$$

$$(4) = P_M(28.0) + P_S(1.0 \text{ mm})$$

$$(5) = P_M(24.0) + P_S(2.0 \text{ mm})$$

Therefore, in the case of FIG. 4(a), eight types in total of pattern elements having different lengths are formed through combination of three main elements $P_M$ with three subelements $P_S$. The increase in the number of pattern elements brings about an improvement in the effect of preventing the noise of the tire.

In FIG. 4(b), the same main elements $P_M$ as that of FIG. 4(a) and a subelement $P_S$ having a length of 2.0 mm in the circumferential direction of the tire are prepared, and the subelement $P_S$ is combined with main elements $P_M$ respectively having lengths of 24.0 mm and 28.0 mm to prepare two types of combination pattern elements $P_C(1)$ and (2). In the case of FIG. 4(b) as well, five types in total of pattern elements having different lengths are prepared by combining a single type of subelement $P_S$ with two types of main elements $P_M$. Therefore, as with FIG. 4(a), an increase in the number of pattern elements brings about an improvement in the effect of preventing the noise of the tire. Further, in this case, the manufacturing cost of a mold for production of the tire is substantially the same as that of a mold for production of the tire having a tread pattern comprising only three types of main elements $P_M$ because only a single type of subelement $P_S$ having a simple design structure is newly added.

In the case of FIG. 4(c), the same elements as those of FIG. 4(b), i.e., three types of main elements $P_M$ respectively having lengths of 24.0 mm, 28.0 mm, and 32.0 mm and a subelement $P_S$ having a length of 2.0 mm are used to provide combination pattern elements $P_C(1)$ and (2) of FIG. 4(b) and further the longest combination pattern element $P_C[P_M(32.0) + P_S(2.0 \text{ mm})]$, i.e., six types in total of pattern elements. That is, a main element $P_M$ having a ratio $\alpha$ of 1.32 (32.0/24.0) can be converted into a combination pattern element $P_C$ having a ratio $\alpha$ of 1.42 (34.0/24.0) which exerts a larger effect of reducing the noise of the tire.

In the present invention, as shown in FIGS. 4(a), 4(b), and 4(c), a small number of types of main elements $P_M$ are used in combination with a subelement $P_S$ having a simple design structure to prepare combination pattern elements $P_C$, which enables the apparent number of types of main elements $P_M$ to be increased. Therefore, the tire of the present invention is not only excellent in the effect of preventing the noise of the tire in spite of the fact that the number of types of main elements $P_M$ is small but also low in the production cost because the mold can be simply manufactured.

Further, when a reduction in the manufacturing cost of the mold is desired to take preference over the effect of reducing the noise, the number of types of main elements $P_M$ and subelements $P_S$ may be reduced. For example, a few types of main elements $P_M$ and a single type of subelement $P_S$ are used to prepare three or four types of combination pattern elements $P_C$, and the ratio $a_c$ of the length of longest combination pattern element in that of the shortest combination pattern element in the circumferential direction of the tire is preferably set at 1.3 to 1.5 from the viewpoint of the effect of reducing the noise.

On the other hand, the effect of reducing the noise can be further improved by using about five types of main elements and two or three types of subelements to prepare about ten types of combination pattern elements $P_C$ and setting the ratio $a_c$ at 1.6 or more.

EXAMPLES

The effect of the present invention will now be described in more detail through a comparison of an Example of the present invention with Comparative Examples.

EXAMPLE 1 AND COMPARATIVE EXAMPLES 1 AND 2

The following three types of radial tires different from each other in the tread pattern were prepared. These tires had the same size, i.e., a size of 165 SR 13.

These tires were each rimmed by making use of a rim of 5J×13 and subjected to measurement of the degree of occurrence of noise according to JASO C606-73 "Testing Method of Noise of Tire" under conditions of a pneumatic pressure of 2.0 kgf/cm² and a load of 300 kgf.

Figures 5A, 5B:
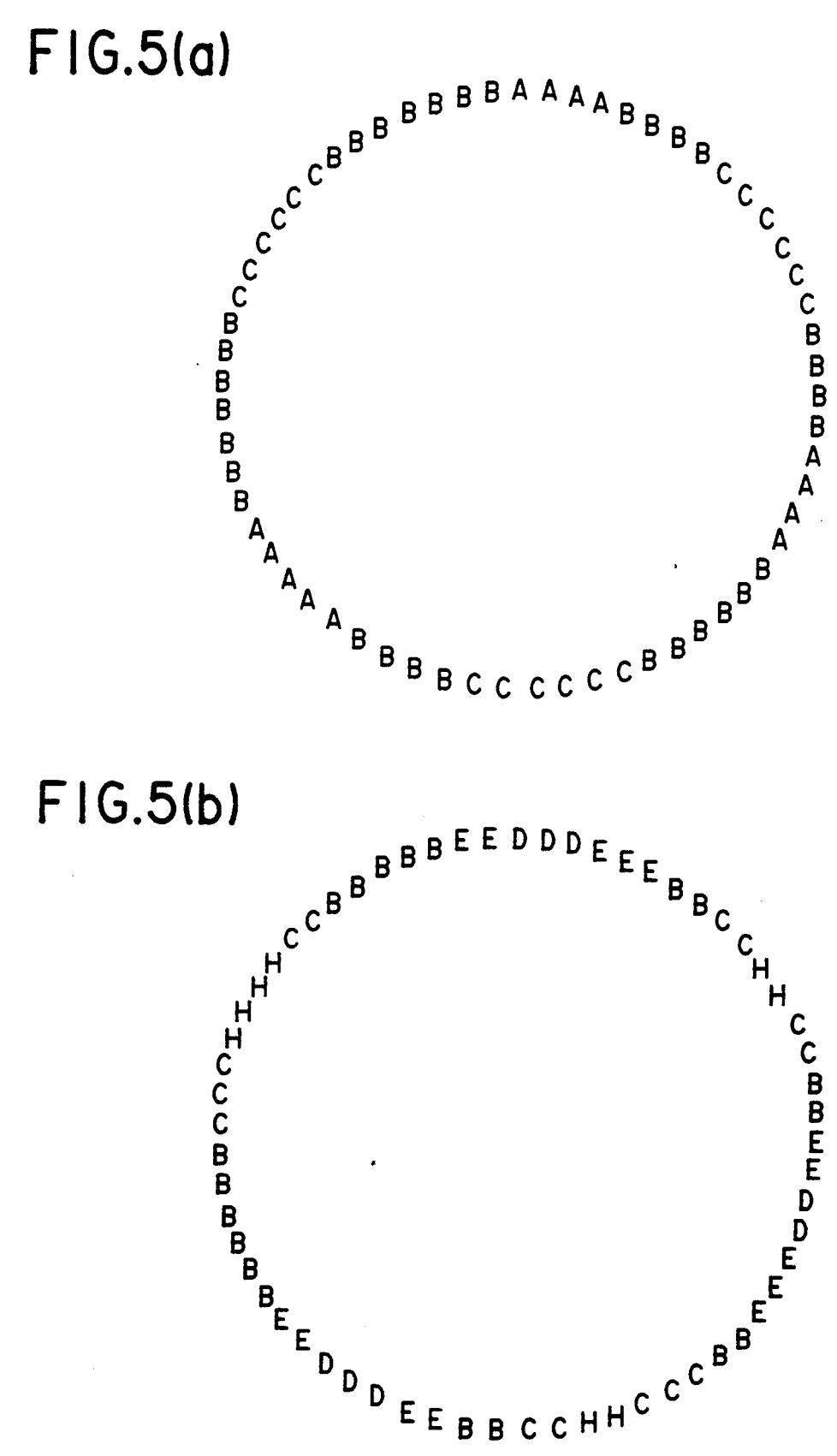

Comparative tire I: a tire wherein main element $P_M$ (A) having a length of 33.0 mm in the circumferential direction of the tire, main element $P_M$ (B) having a length of 29.0 mm in the circumferential direction of the tire, and main element $P_M$ (C) having a length of 25.5 mm in the circumferential direction of the tire were disposed over the entire periphery of the tire in the order shown in FIG. 5(a).

In FIG. 5(a), the order of disposition of the main elements were represented by only letters A, B, and C with omission of $P_M$.

Comparative tire II: a tire wherein main element $P_M$ (D) having a length of 35.0 mm in the circumferential direction of the tire, main element $P_M$ (E) having a length of 32.0 mm in the circumferential direction of the tire, main element $P_M$(B) having a length of 29.0 mm in the circumferential direction of the tire, main element $P_M$ (C) having a length of 25.5 mm in the circumferential direction of the tire, and main element $P_M$ (H) having a length of 22.5 mm in the circumferential direction of the tire were disposed over the entire periphery of the tire in the order shown in FIG. 5(b).

In FIG. 5(b), the order of disposition of the main elements were represented by only letters, B, C, D, E, and H with omission of $P_M$.

Tire III of the present invention: Main elements B, D, and H of Comparative tire II and a subelement $P_S$ having a length of 3.0 mm were used, and main elements B and H were each combined with the subelement $P_S$ to prepare the following combination pattern elements $B_C$ and $H_C$:

$$B_C = B(29.0 \text{ mm}) + P_S(3.0 \text{ mm})$$

$$H_C = H(22.5 \text{ mm}) + P_S(3.0 \text{ mm})$$

These combination pattern elements $B_C$ and $H_C$ were disposed instead of two main elements E and C of Comparative tire II, respectively, in the order shown in FIG. 5(b) to prepare Tire III of the present invention.

Figure 6:
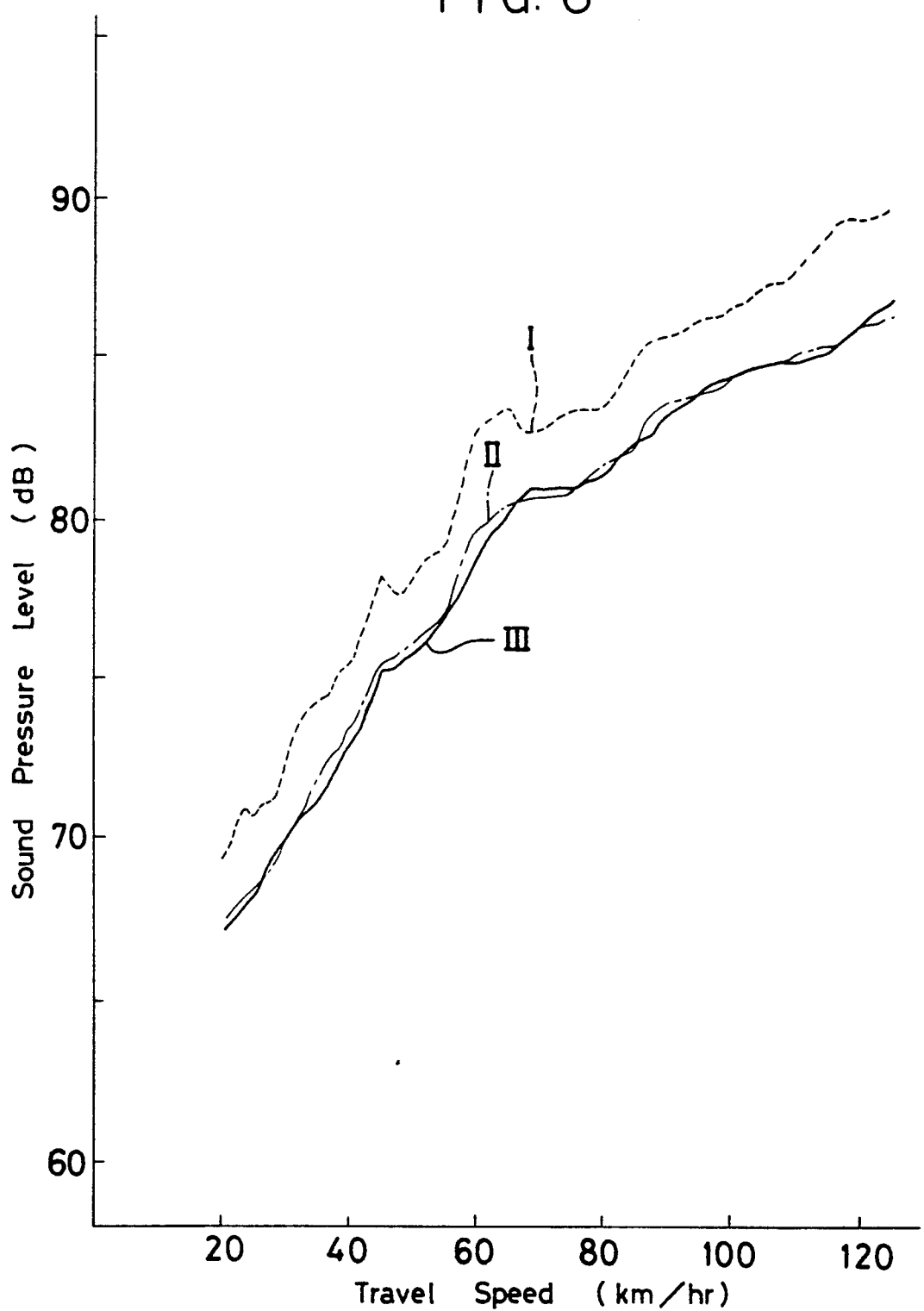
FIG. 6 is a graph showing the relationship between the travel speed and the sound pressure level.

The results are shown in FIG. 6 wherein the graph shows the relationship between the travel speed of a vehicle and the sound pressure level at the travel speed. As is apparent from FIG. 6, the tire of the present invention having a tread pattern comprising a single type of a subelement and three types of main elements exhibits substantially the same noise level as that of tire II having a tread pattern comprising five types of main elements although the types of main elements are substantially the same as those of Comparative tire I.

Further, since the tread pattern of the tire of the present invention comprises three types of main elements and a single type of subelement having a simple design and a small length in the circumferential direction of the tire, the manufacturing cost of the mold is substantially the same as that of the mold for Comparative tire I, so that the tire of the present invention advantageously brings about no increase in the production cost of the tire.

I claim:

1. A method of providing a tire tread surface mold pattern for a tire tread pattern to be molded comprising a plurality of pattern elements different from each other in length in a circumferential direction of the tire to be molded, said method comprising the steps of:

providing at least two main pattern elements having a different length in a circumferential direction of the tire to be molded equal to at least 1.0% of the outer circumference of the tread surface;

providing at least one sub-pattern element capable of forming an extension of said main pattern elements in the circumferential direction of the tire to be molded when said at least one sub-pattern element is juxtaposed against one of said main pattern elements;

said at least one sub-pattern element having a length in the circumferential direction of the tire to be molded of at least 0.5 mm and no greater than 0.6% of the outer circumference of the tread surface;

arranging said main pattern elements and said sub-pattern elements circumferentially to develop said tread surface mold pattern with certain ones of said main pattern elements in abutting adjacent relation and other ones of said main pattern elements disposed in combination with an adjacent abutting sub-pattern element, each of said sub-pattern elements being disposed in combination with a main pattern element to form a combination pattern element and said combination pattern elements formed by a main pattern element and said at least one sub-pattern element having a length different from the length of said main pattern elements, whereby said main pattern elements and combination pattern elements provide a larger number of tread surface mold pattern elements of different lengths than the total number of main pattern elements and sub-pattern elements.

2. The method of providing a tire tread surface mold pattern as defined by claim 1 and further including the steps of: providing said main pattern elements with each main pattern element including at least one block defined between at least one main groove and another groove of said tread pattern to be molded, providing each sub-pattern element with each sub-pattern element including at least one block defined at least in part by a main groove of said tire tread pattern to be molded, and arranging said main pattern elements and said sub-pattern elements forming each of said combination pattern elements with a main groove of the main pattern element and the main groove of the sub-pattern element aligned in the combination pattern element.

3. A method of providing a tire tread surface mold pattern comprising a plurality of pattern elements different from each other in length in a circumferential direction of a tire tread pattern to be molded, said method comprising the steps of: providing two to five types of main pattern elements with each main pattern element including at least one block defined between at least one main groove and another groove of said tread pattern to be molded and each type of main pattern element having a different length in a circumferential direction of the tire to be molded which is 1.0% to 2.4% of the outer circumference of the tread molding surface;

providing one to three different types of sub-pattern elements with each sub-pattern element including at least one block defined at least in part by a main groove of said tire tread pattern to be molded and capable of forming an extension of said main pattern elements in the circumferential direction of the mold when each type of sub-pattern element is juxtaposed against one of said main pattern elements with said main groove aligned with a main groove of the main pattern element;

each of said different types of sub-pattern elements having a length in the circumferential direction of the tire to be molded of at least 0.5 mm and no greater than 0.6% of the outer circumference of the tread surface;

arranging said main pattern elements and said sub-pattern elements circumferentially to develop said tread surface mold pattern with certain ones of said main pattern elements in abutting adjacent relation and other ones of said main pattern elements disposed in combination with an adjacent abutting sub-pattern element, each of said sub-pattern elements being disposed in combination with a main pattern element to form a combination pattern element and said combination pattern elements formed by a main pattern element and at least one sub-pattern element having a length different from the length of said main pattern elements, whereby said main pattern elements and said combination pattern elements provide a larger number of tread pattern elements of different lengths than the total number of main pattern elements and sub-pattern elements.

* * * * *